(12) United States Patent
Walls et al.

(10) Patent No.: US 12,607,711 B2
(45) Date of Patent: Apr. 21, 2026

(54) SYNTHETIC APERTURE RADAR CORNER REFLECTOR

(71) Applicant: VerQuin LLC, San Clemente, CA (US)

(72) Inventors: Christian Walls, San Clemente, CA (US); William Funderburk, San Clemente, CA (US)

(73) Assignee: Verquin LLC, San Clemente, CA (US)

( * ) Notice: Subject to any disclaimer, the term of this patent is extended or adjusted under 35 U.S.C. 154(b) by 282 days.

(21) Appl. No.: 18/459,001

(22) Filed: Aug. 30, 2023

(65) Prior Publication Data

US 2024/0077577 A1 Mar. 7, 2024

Related U.S. Application Data

(60) Provisional application No. 63/402,194, filed on Aug. 30, 2022.

(51) Int. Cl.
| | |
|---|---|
| *G01S 7/03* | (2006.01) |
| *G01S 7/00* | (2006.01) |
| *G01S 7/40* | (2006.01) |
| *G01S 13/88* | (2006.01) |

(52) U.S. Cl.
CPC .............. G01S 7/032 (2013.01); G01S 7/003 (2013.01); G01S 7/4017 (2013.01); G01S 13/885 (2013.01)

(58) Field of Classification Search
CPC ........ G01S 7/032; G01S 7/003; G01S 7/4017; G01S 13/885; G01S 7/4091; G01S 13/90; H01Q 15/18
See application file for complete search history.

(56) References Cited

FOREIGN PATENT DOCUMENTS

| | | | | | |
|---|---|---|---|---|---|
| CN | 105974368 | A | * | 9/2016 | ............. G01S 19/13 |
| CN | 106443603 | A | * | 2/2017 | ............... G01C 1/00 |
| CN | 106019235 | B | * | 4/2019 | ............... G01S 7/02 |
| CN | 112285661 | A | * | 1/2021 | ............... G01S 7/40 |
| CN | 212364597 | U | * | 1/2021 | |
| CN | 113740806 | A | * | 12/2021 | ............... G01S 7/02 |

OTHER PUBLICATIONS

Doerry, A. W., Reflectors for SAR Performance Testing, 2nd edition Sandia Report SAND2014-0882,(2014) (Year: 2014).*

(Continued)

*Primary Examiner* — Jack W Keith
*Assistant Examiner* — John Bishoy Sam Abraham
(74) *Attorney, Agent, or Firm* — Straylight, LLP

(57) ABSTRACT

Aspects of the disclosed technology provide solutions for improving satellite calibration reflectors and in particular, for improving performance of corner reflectors used for calibrating synthetic aperture radar (SAR) satellites. A process of the disclosed technology can include steps for constructing a satellite ground reflector comprising coupling a braced foundation to a trihedral reflector, wherein the trihedral reflector comprises a plurality of vertices and coupling two or more survey pins to two or more of the vertices, wherein each of the two or more survey pins are configured to facilitate one or more measurements of the satellite ground reflector. A process of the disclosed technology can also include steps for precise measuring and precise timing by placing GNSS instrumentation at or near the vertices of the satellite ground reflector.

18 Claims, 10 Drawing Sheets

(56)           References Cited

OTHER PUBLICATIONS

Garthwaite, M.C. et al., The Design of Radar Corner Reflectors for the Australian Geophysical Observing System: a single design suitable for InSAR deformation monitoring and SAR calibration at multiple microwave frequency bands, Geoscience Australia (2015) (Year: 2015).*

Shaeffer, J., Tuley, M., Knott, E., Radar Cross Section (2nd Edition) Chapter 7: Radar Cross Section Reduction, SciTech Publishing. (2004) (Year: 2004).*

\* cited by examiner

200

202

204

700

702

704

706

900

Couple A Braced Foundation To A Trihedral Reflector, Wherein The Trihedral Reflector Comprises A Plurality Of Vertices ⌐ᴸ910

Couple Two Or More Survey Pins To Two Or More Of The Vertices, Wherein Each Of The Two Or More Survey Pins Are Configured To Facilitate One Or More Measurements Of The Satellite Ground Reflector ⌐ᴸ920

SYNTHETIC APERTURE RADAR CORNER REFLECTOR

RELATED APPLICATION

This application claims the benefit of U.S. Provisional Application No. 63/402,194, filed Aug. 30, 2022, which is hereby incorporated by reference in its entirety.

BACKGROUND

Technical Field

The present disclosure generally relates to solutions for improving satellite calibration reflectors and in particular, for improving performance of corner reflectors used for calibrating synthetic aperture radar (SAR) satellites.

Introduction

Synthetic Aperture Radar (SAR) satellites commonly use corner reflectors for a variety of uses related to calibration and validation of the SAR data (the reflected radar). Collected SAR data can be used for a wide variety of applications including but not limited to the monitoring of: vegetation, soil moisture, tundra motion, glacial melting, sea level rise, atmospheric modeling, magma inflation, strain accumulation on faults, and coseismic and post seismic displacement during and after earthquakes, and the like.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
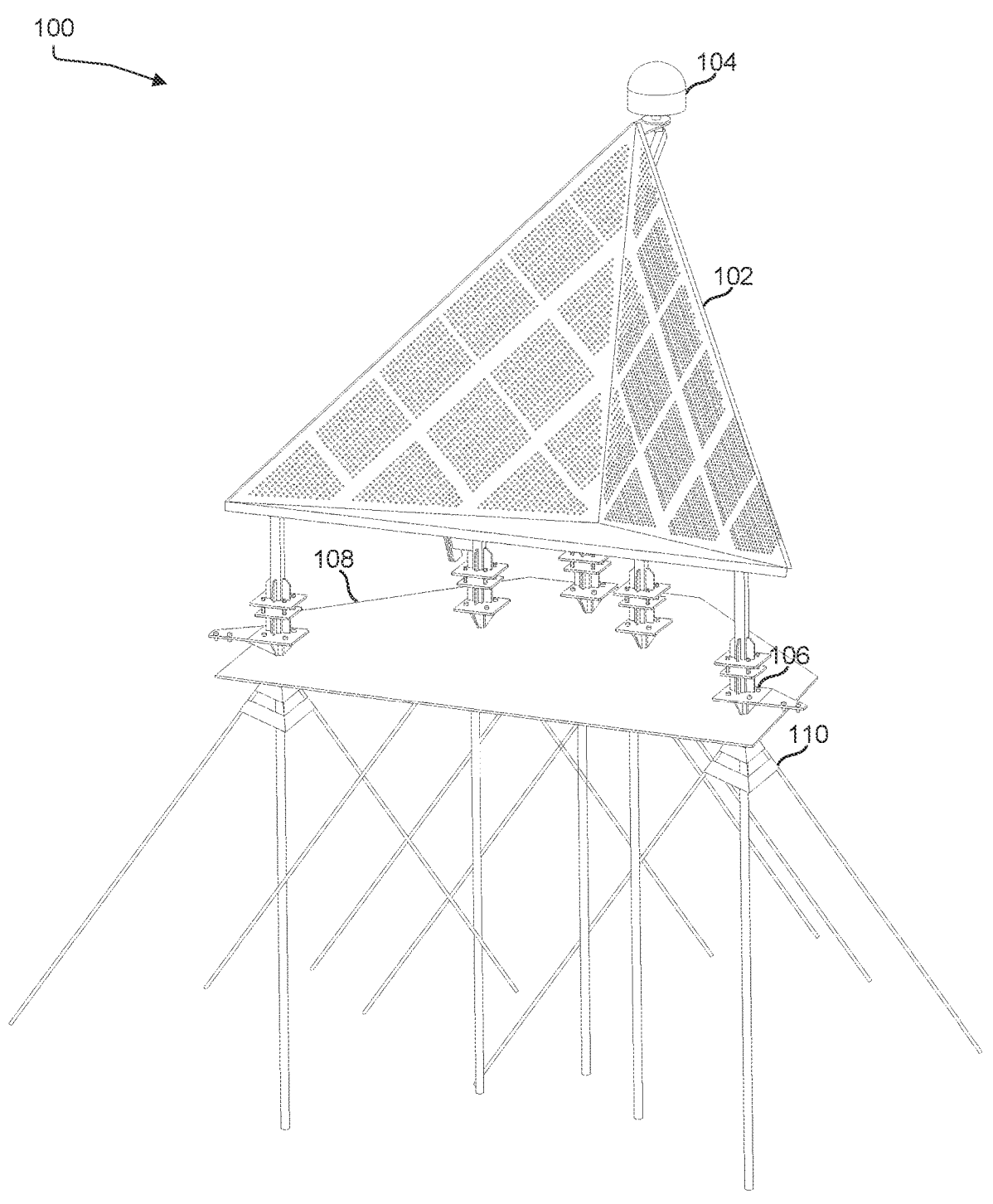
FIG. 1 illustrates an example of a Synthetic Aperture Radar (SAR) corner reflector, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

In some aspects, Synthetic Aperture Radar (SAR) satellites are commonly used for ground mapping as well as target identification. By way of example, the general principle behind SAR is to obtain high resolution images by coherently combining amplitude and phase information of separate radar returns from a plurality of sequentially transmitted pulses from a relatively small antenna on a moving platform. The returns from the pulses, when coherently combined and processed, may result in image quality comparable to a longer antenna, corresponding approximately to the synthetic "length" traveled by the antenna during the acquisition of the image.

A corner reflector (also reflector, satellite ground reflector) can be a passive device used to reflect radio waves back towards the emission source (e.g., satellite). Hence, a corner reflector may be a useful device for radar system calibration. In some instances, a corner reflector can consist of mutually intersected perpendicular plates. The corner reflectors can be used to generate a particularly strong radar echo from objects that would otherwise have only a very low effective Radar Cross Section (RCS). A typical corner reflector may consist of two or three electrically conductive surfaces that are mounted crosswise (e.g., at an angle of exactly 90 degrees). Incoming electromagnetic waves may be backscattered by multiple reflections accurately in the direction from which they came. Thus, even small objects (e.g., with a small RCS) can yield a sufficiently strong echo. In some instances, the larger a corner reflector is, the more energy may be reflected. By way of example, trihedral corner reflectors may be the preferred canonical target for SAR performance evaluation for many radar developments programs.

Corner reflectors may be used in areas with low correlation or high decorrelation. For example, in agriculture farms with grassy areas that change in height repeatedly and very often (e.g., an area of high decorrelation). In another example, corner reflectors can be used as fixed reference points for areas of high decorrelation (e.g., such as an area with a lot of trees) by serving as a marker that can be tied into a geospatial reference frame. Those skilled in the art will appreciate that other applications are contemplated.

Conventional corner reflectors, which may have unstable foundations, often move, or change position over time. These shifts in location (or reflector pose) may cause problems for long term calibration and validation. For example, the calibration and validation of active aerial Light Detection and Ranging (LiDAR) and satellite radar platforms may utilize a corner reflector to maintain a stable position. Accordingly, it would be beneficial to develop a solution of a corner reflector with a stable platform along and improved accuracy and precision of repeat ground-based survey measurements.

Solutions are provided herein for a corner reflector that maintains a stable position over time. By way of example, a VerQuin corner reflector can provide a durable and geodetically stable radar reflector that can maintain a stable position over time. The reinforced custom design of the VerQuin corner reflector may enable survey grade (e.g., ≤±2 cm orthometric height) positioning using real-time kinematic surveying or geodetic grade (≤±4 mm orthometric height) using laser techniques for calibration and validation of active aerial LiDAR and space-based satellite radar platforms to ground-based positioning measurements. Strategically designed, machined, and mounted survey pins (also Funderpins) can create individual subnetworks of survey points within each reflector or as a network of reflectors and may allow the incorporation of a variety of direct and indirect measurement techniques including, but not limited to, static or real-time GNSS (Global Navigation Satellite Systems), EDM (Electronic Distance Measurement or total station), offsets, and least-squares adjustments.

In some aspects, Funderpins may be positioned at the vertices of the trihedral reflector for monitoring orientation (e.g., pitch, roll, yaw), deformation, and elevation change within any desired spatial reference frame. Additional stability and control of pitch, roll, and yaw can be achieved by the leveling and azimuthal control system. For continuous epoch-by-epoch measurements, position time-series development, and remote monitoring, a continuous GNSS (cGNSS) antenna mount can allow for individual use or may be tied directly into the machined offsets of each reflector's respective subnetwork of survey points to perform least squares adjustments of any reference point(s) of the reflector. In some cases, cGNSS may provide three-dimensional (3D) measurements with an accuracy up to several millimeters and can offer daily or sub-daily resolution. In some instances, cGNSS may include the permanent installation of an antenna in a fixed, specific location.

FIG. 1 illustrates an example of a SAR corner reflector 100, according to some aspects of the disclosed technology. By way of example, SAR corner reflector 100 can be a VerQuin corner reflector. The corner reflector 100 may include a trihedral reflector 102 comprising three mutually perpendicular, intersecting flat surfaces forming a corner. In some aspects, when a radar wave (e.g., from a SAR satellite) hits one of the surfaces of trihedral reflector 102, the wave can reflect onto the second surface and then onto the third surface before being sent back towards the radar. The multi-reflection among the surfaces of trihedral reflector 102 can enable a strong return signal. In SAR applications, corner reflector 100 with trihedral reflector 102 may be used in applications including, but not limited to, calibration targets (e.g., calibrate the radar system and validate perform), ground control points (e.g., georeferencing or rectifying SAR imagery), and reference points (e.g., for scientific experiments).

The SAR corner reflector 100 may be mounted to a surface or foundation 108 (e.g., ground, ice or snow, solid rock, concrete, metal, etc.) via one or more stantions 106 (also support structures or rigid structures) that may provide support between trihedral reflector 102 and foundation 108. The one or more stantions 106 may be coupled to a monument (also monumentation) system 110 (e.g., a geodetic grade monument or braced foundation), where monument system 110 can be located beneath surface 108. In some aspects, monument system 110 may be a braced foundation or structure that can provide geodetic grade stability to SAR corner reflector 100.

In some cases, one or more cGNSS receivers 104 may be attached to or near one or more of the vertices (or corners) of trihedral reflector 102. The cGNSS receiver 104 may add functionality to SAR corner reflector 100 by continuously recording position data (e.g., using GNSS systems such as GPS, GLONASS, Galileo, etc.) of SAR corner reflector 100. The cGNSS receiver 104 may collect position data over both short and long time durations. In some aspects, the position data from cGNSS receiver 104 may be compared with position data derived from radar which may facilitate calibration and validation of SAR corner reflector 100.

In addition to providing high-rate GNSS data, cGNSS receiver 104 can also provide two additional survey control points for further geometric control (e.g., one offset from the apex or top vertex of trihedral reflector 102 and one projected normally below the antenna reference point and geodetic reference point or cGNSS receiver 104).

The stantions 106 and monument system 110 may be fabricated from one or more types of metal including, but not limited to, stainless steel, carbon steel, galvanized steel, aluminum, copper, bronze, brass, gold, titanium, and cast iron. In some instances, stantions 106 and additional materials surrounding trihedral reflector 102 may be coated with a magnetic radar absorbent material (MagRAM) which can reduce radar reflections. By way of example, stantions 106 may be coated with MagRAM to minimize multipath radar reflections to ensure the primary radar reflection is from trihedral reflector 102. In some instances, MagRAM may coat or cover all satellite-facing surfaces that are not part of the aperture of SAR corner reflector 100.

Figure 2:
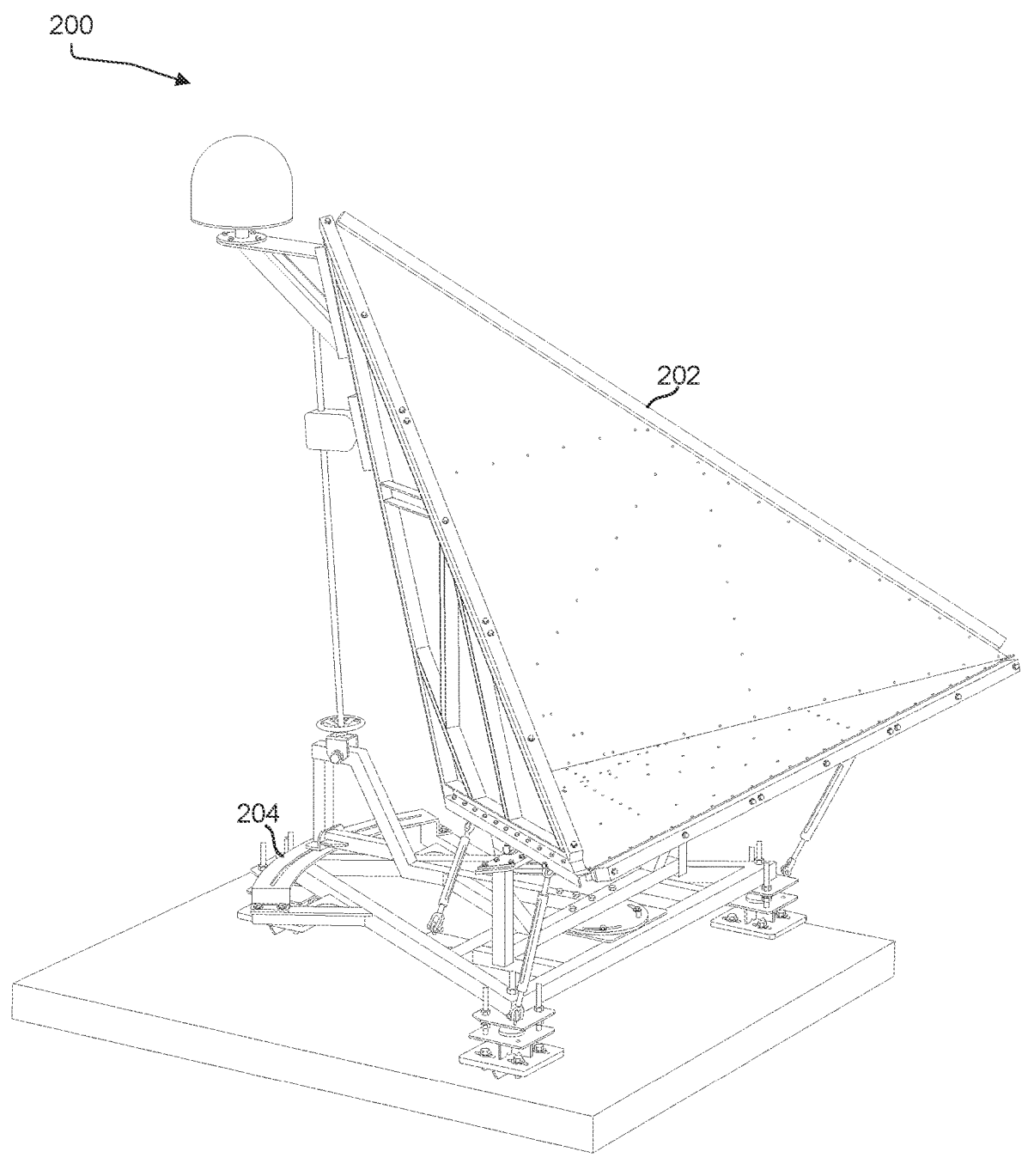
FIG. 2 illustrates an example of a Synthetic Aperture Radar (SAR) corner reflector with a rotational base, according to some aspects of the disclosed technology.

FIG. 2 illustrated an example of a SAR corner reflector 200 with a rotational base, according to some aspects of the disclosed technology. The SAR corner reflector 200 may be analogous to the example SAR corner reflector 100 illustrated in FIG. 1. The SAR corner reflector 200 may include a trihedral reflector 202 mounted on a rotational base 204 instead of a fixed foundation as illustrated in FIG. 1. The rotational base 204 may swivel in the azimuth direction. The rotational base 204 may provide fine tuning of SAR corner reflector 200 for communication with a satellite. The rotational base 204 may allow forward and back tilt of the corner reflector 200. The adjustable sub-assemblies of the rotational base 204 may allow leveling of the full assembly and may allow vertical height adjustments to test detectable limits in calibration and validation of the radar signal (e.g., received from the satellite).

Figure 3:
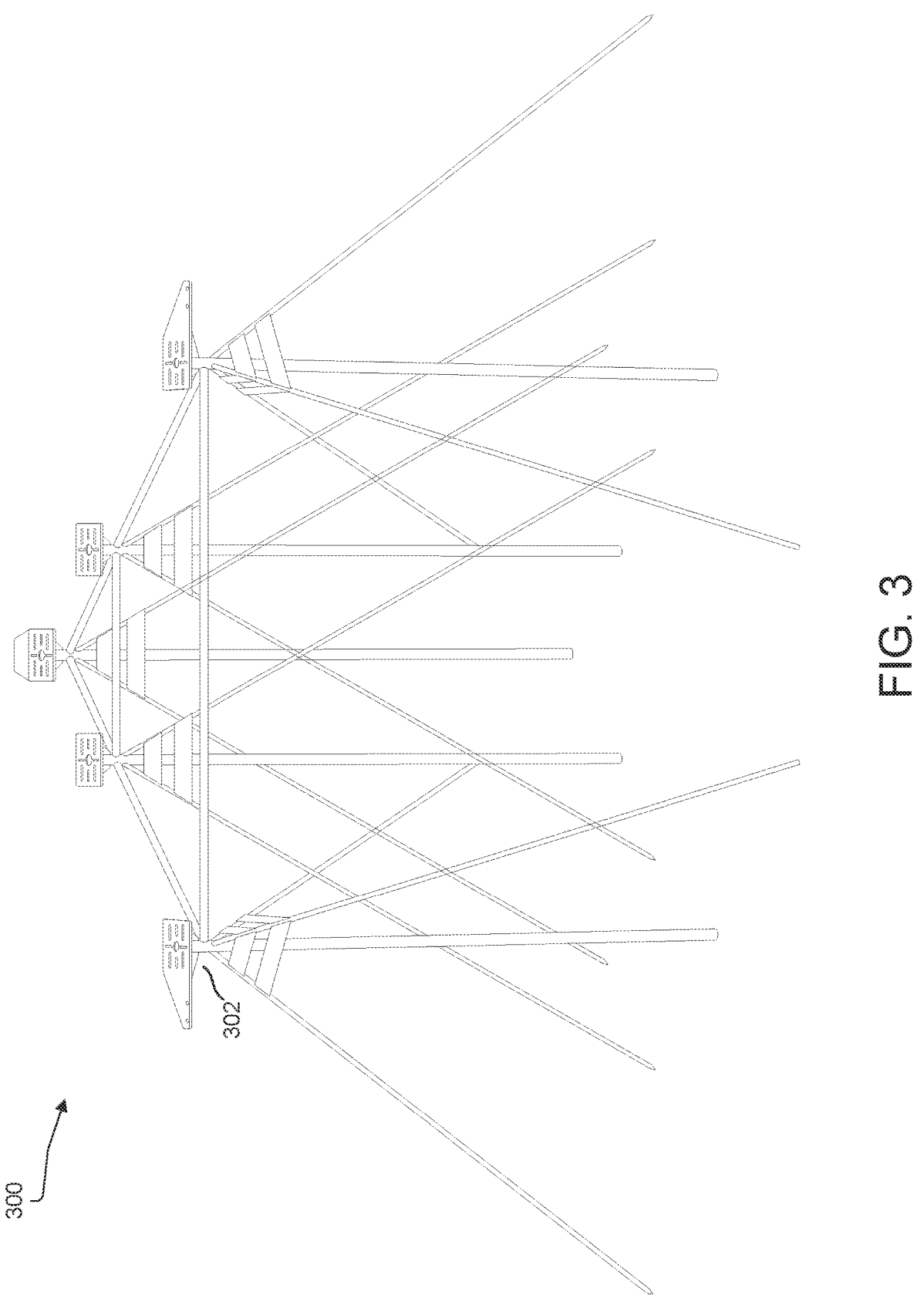
FIG. 3 illustrates an example of a braced monumentation system, according to some aspects of the disclosed technology.

FIG. 3 illustrates an example of a braced monumentation system 300, according to some aspects of the disclosed technology. The braced monumentation system 300 (e.g., monument system 110 as illustrated in FIG. 1) may include one or more metal gussets 302 that can reinforce and connect components at an intersection (e.g., between the support structures of the SAR corner reflector and the braced monumentation system 300). By way of example, metal gussets 302 on both the internal and external intersection points may provide stable points at the vertex of the monument design (e.g., quad or quincunx monument design as illustrated in FIG. 3). In some cases, individual monuments may be linked or welded with cross pipes to make the entire suite of monuments a single rigid structure. The monuments may be drilled or epoxied directly into bedrock or driven into sediment with the upper portions encased in concrete (e.g., a concrete slab over the stainless-steel foundation).

Figure 4:
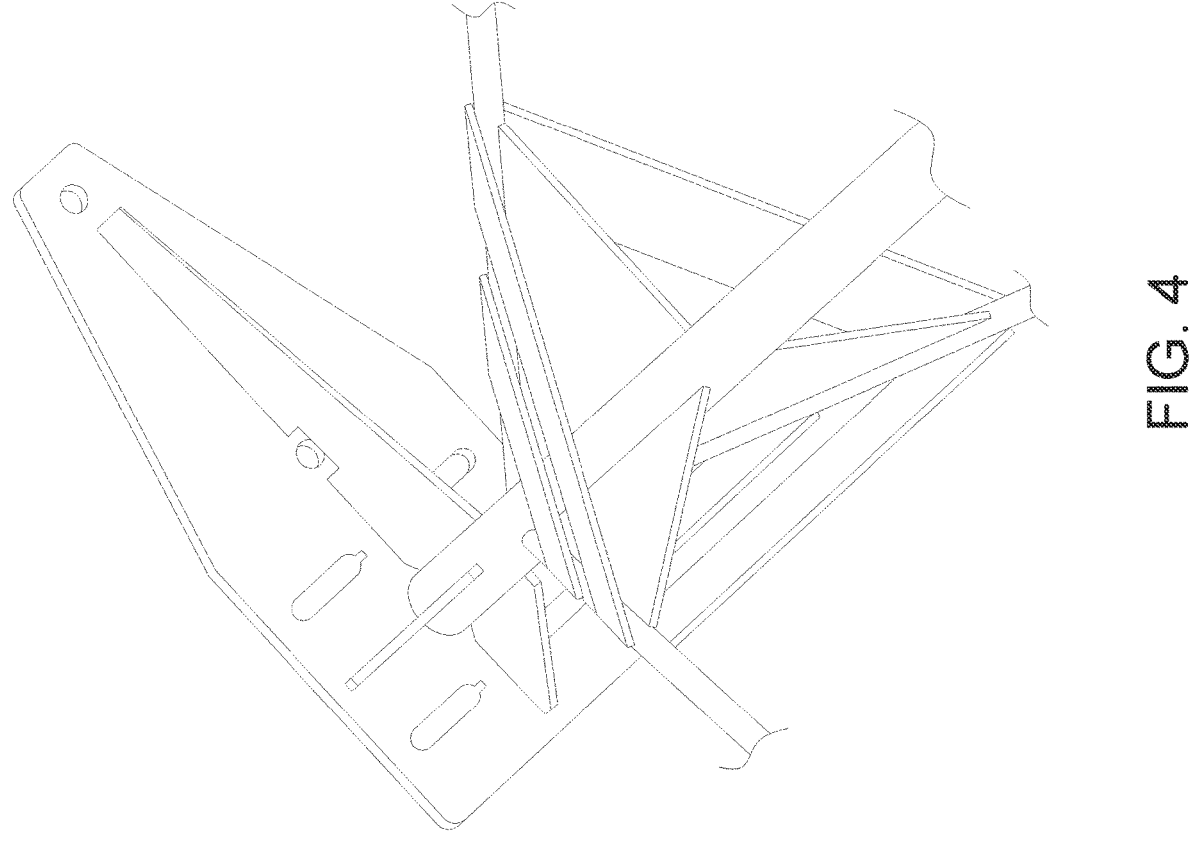
FIG. 4 illustrates an example of a vertex gusset for use with a SAR corner reflector, according to some aspects of the disclosed technology.
Figure 4:

FIG. 4 illustrates an example of a vertex gusset 400 for use with a SAR corner reflector, according to some aspects of the disclosed technology. The vertex gusset 400 as illustrated in FIG. 4 can be the underside view of a metal gusset 300 (e.g., as illustrated in FIG. 3) located at a vertex of the monument system, such as the vertex location associated with the vertex of the trihedral reflector. In some cases, a plumb bob may be suspended (e.g., via a string or wire) from a Funderpin or survey pin at the vertex of a trihedral reflector over vertex gusset 400 for monitoring and measuring purposes (e.g., monitoring changes in position and/or orientation of the trihedral reflector or SAR corner reflector). The Funderpin and plumb bob assembly in association with vertex gusset 400 will be discussed in further detail in FIG. 5 below.

Figure 5:
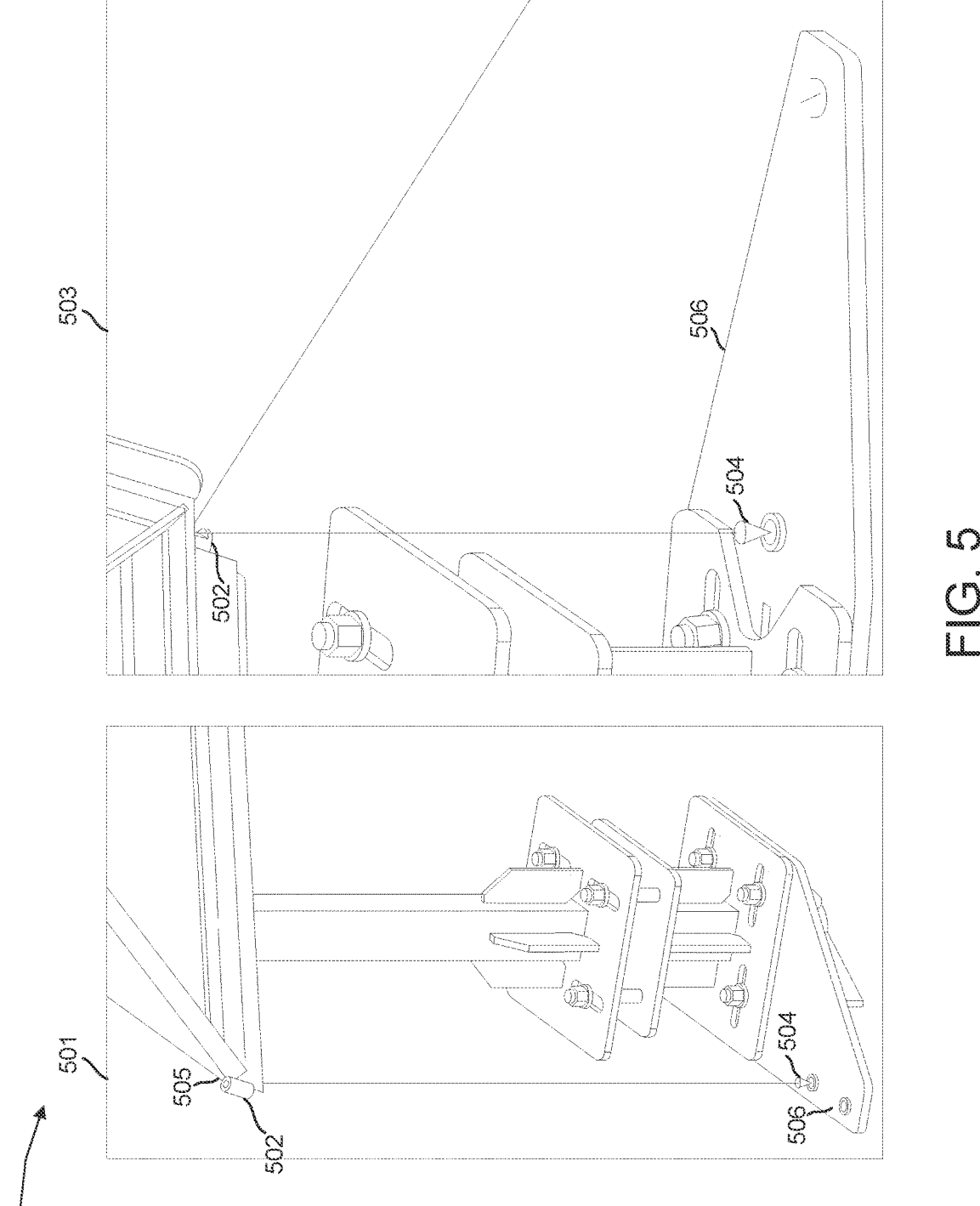
FIG. 5 illustrates an example of a survey ground control system, according to some aspects of the disclosed technology.

FIG. 5 illustrates an example of a survey ground control system 500, according to some aspects of the disclosed technology. A first perspective 501 and second perspective 503 illustrate a survey ground control system 500 with the vertex 505 (e.g., one of the three vertices) of a trihedral reflector with Funderpin 502 and associated plumb bob 504 hanging (e.g., via a string or wire) over vertex gusset 506 (e.g., vertex gusset 400 as illustrated in FIG. 4).

In some aspects, Funderpin 502 may be located at or near each corner or vertex 505 of a trihedral reflector and may provide a point that can be measured to and from in order to monitor changes in the position or orientation of the reflector. By way of example, the measurements from each of the Funderpins 502 may indicate changes in pitch, roll and yaw of the corner reflector (e.g., trihedral reflector portion of the corner reflector).

A plumb bob 504 attached to a Funderpin 502 can provide a vertical reference from each vertex 505 of the reflector and the ground. For example, the plumb bob 504 may hang over vertex gusset 506 such as a specific point designated on vertex gusset 506. If the specific point below plumb bob 504 shifts, this may indicate a change in position or orientation of the reflector. By way of example, real-time kinematic (RTK) or electronic distance measurements (EDM) of these points may allow the dimensions and orientation of the corner reflector to be tied to a local, regional, or global reference frame for refinement of calibration and validation of the SAR signals.

Figure 6:
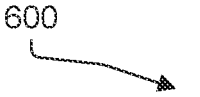
FIG. 6 illustrates an example of a survey pin, according to some aspects of the disclosed technology.
Figure 6:
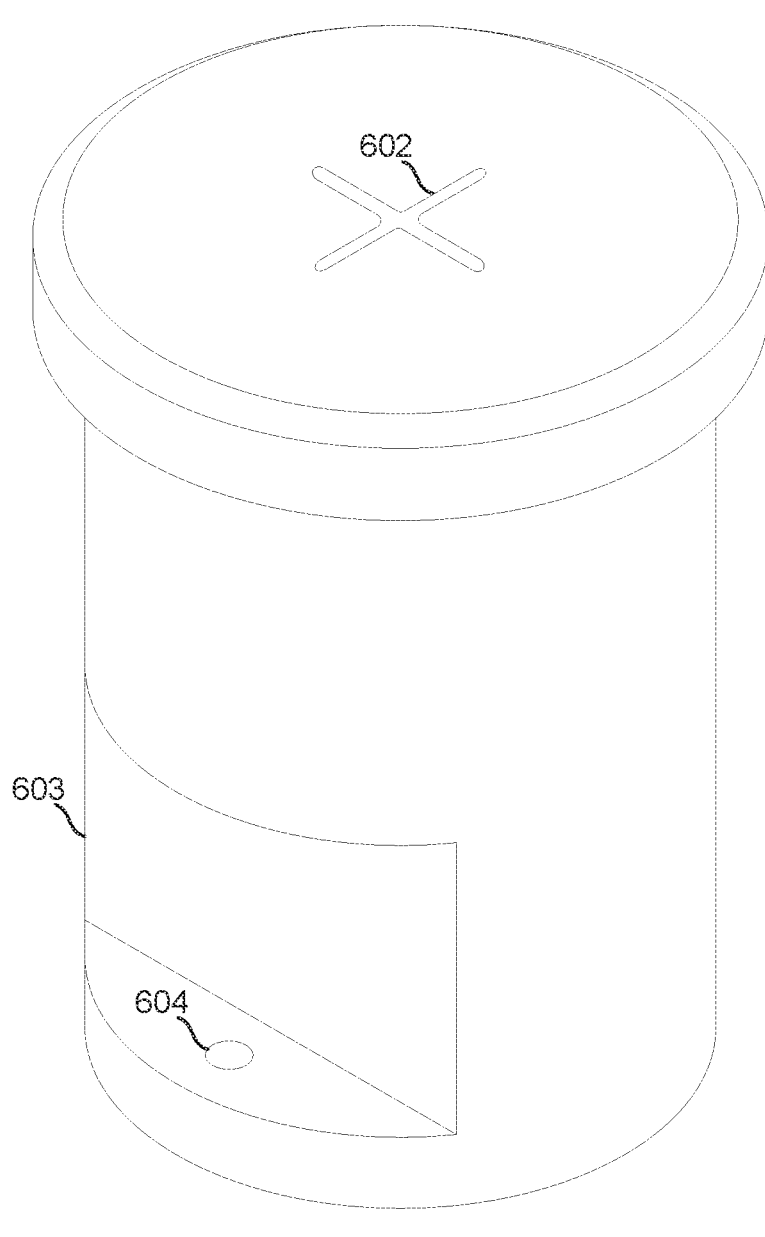

FIG. 6 illustrates an example of a survey pin 600, according to some aspects of the disclosed technology. The survey pin or Funderpin 600 may include a recess or region 602 for tool engagement (e.g., for inserting a survey spike of an optical EDM reflector or RTK rod). A slot 604 (or hole, aperture) may be used to attach or hang (e.g., via a wire, string, etc.) a plumb bob to Funderpin 600. As discussed above, one or more vertices of a corner reflector may include a Funderpin 600 for measurement of pitch, roll, and yaw of the corner reflector. The survey pin 600 may represent the vertices of the trihedral reflector. The Funderpin 600 may also include a cavity 603 (or recessed region) for facilitating the attachment of the plumb bob (e.g., a plumb bob line or wire or string through aperture 604) that may be in direct alignment with the survey pin 600 for a given angle of tilt of a trihedral reflector.

The region 602 of Funderpin 600 may include cross hatch grooves for visual and physical assistance with placement of precision measuring devices (e.g., assistance for surveyors for placement of the survey spike in the survey pin 600 which can be aided in its placement by observation of the cross hatch).

In some cases, a Funderpin 600 at each vertex of a corner reflector may allow for vector-based reconstruction of the trihedral planes for creating a scalable subnetwork of survey points for applications like planar orientation and deformation analyses and can be used as a larger network to perform least squares adjustments of campaign or continuous measurements. Centered on each rail of the reflector may include stanchion mounts for leveling and leaving surveying rods in a fixed position (e.g., rods can have either reflectors or GNSS for real-time kinematic analysis).

Figure 7:
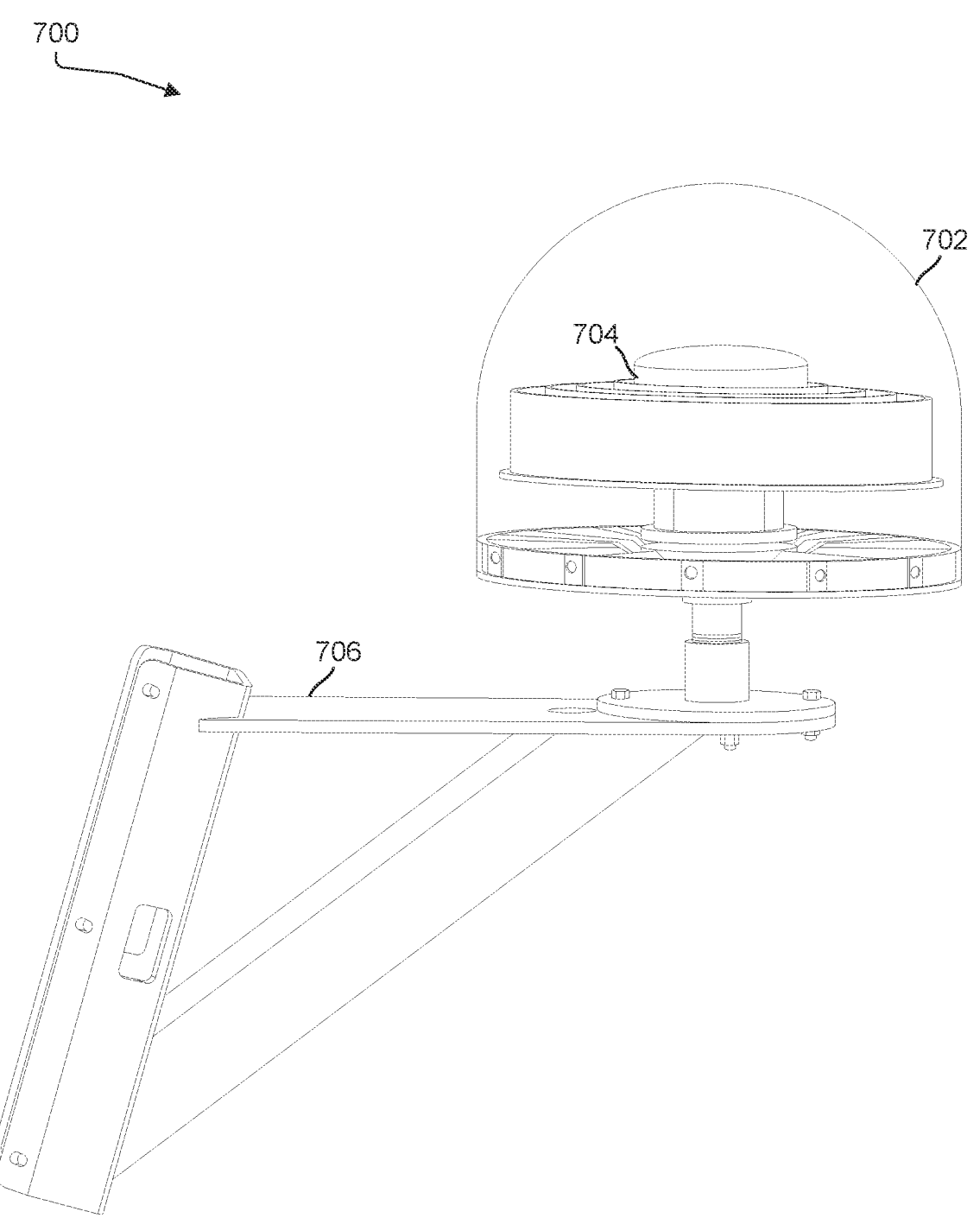
FIG. 7 illustrates an example of a continuously operating Global Navigation Satellite System (GNSS) system, according to some aspects of the disclosed technology.

FIG. 7 illustrates an example of a continuously operating GNSS (cGNSS) system 700, according to some aspects of the disclosed technology. The cGNSS system 700 includes a radome 702 enclosing a high precision GNSS antenna and receiver 704 (e.g., to receive one or more GNSS satellite signals) that is attached to a mount 706. In some aspects, the GNSS antenna may be linked via coaxial cable to a high precision GNSS receiver (e.g., not illustrated) off the structure or may be an integrated GNSS antenna and receiver. As discussed above, one or more cGNSS systems 700 may be attached to or near one or more vertices of a corner reflector and provide additional positioning information with respect to the Funderpins and survey ground control system 500 as discussed in FIG. 5. For example, continuous operation of cGNSS system 700 may enable timing and positioning comparison of data between the radar satellite and GNSS constellation timed signals for refinement of calibration techniques.

In some instances, boosting the timing frequency (e.g., from 1 Hz. to 100 Hz.) of GNSS receiver 704 may provide enhanced temporal resolution, which may be beneficial for dynamic phenomena like space weather and ionospheric electron content fluctuations. In some cases, the GNSS antenna and receiver 704 timing for SAR applications may be strengthened by observing multiple satellite constellations (e.g., GPS and Galileo), integrating high-quality clocks (e.g., atomic clocks), and optimizing antenna placement to mitigate multipath effects and maximize satellite visibility.

Figure 8A:
FIG. 8A illustrates an example environment of a corner reflector for various applications, according to some aspects of the disclosed technology.
Figure 8A:
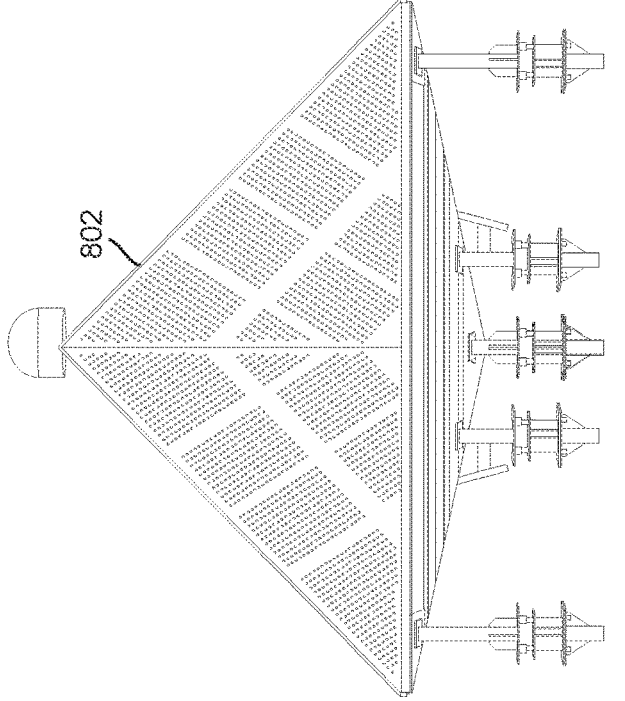
Figure 8B:
FIG. 8B illustrates another example environment of a corner reflector for various applications, according to some aspects of the disclosed technology.
Figure 8B:
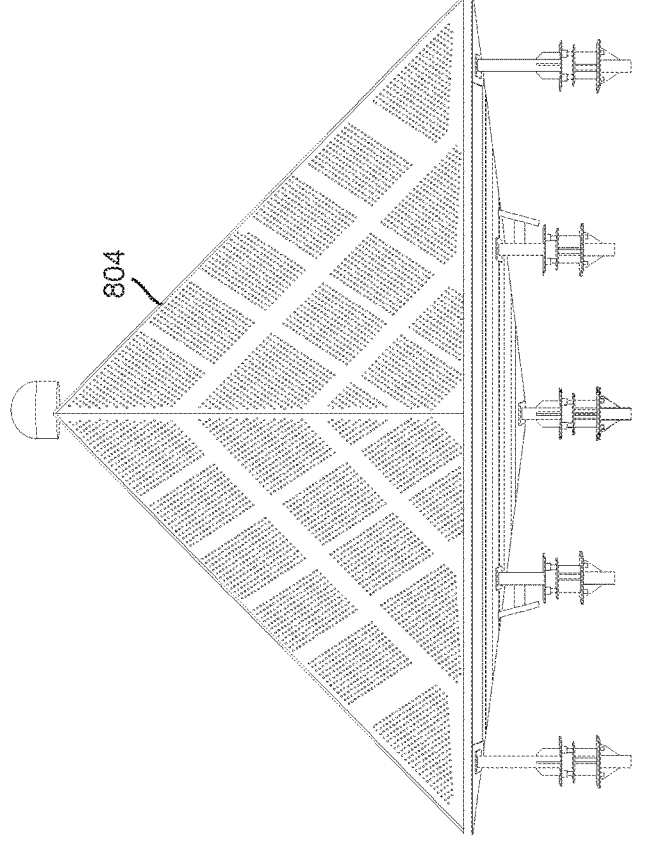

FIG. 8A illustrates an example environment 800 of a corner reflector for various applications, according to some aspects of the disclosed technology. A first corner reflector 802 may be used for SAR applications. FIG. 8B illustrates another example environment 801 of a corner reflector for various applications, according to some aspects of the disclosed technology. A second corner reflector 804 may be used for NASA-ISRO SAR (NISAR) applications. Those skilled in the art will appreciate additional applications for first corner reflector 802 and second corner reflector 804.

Figure 9:
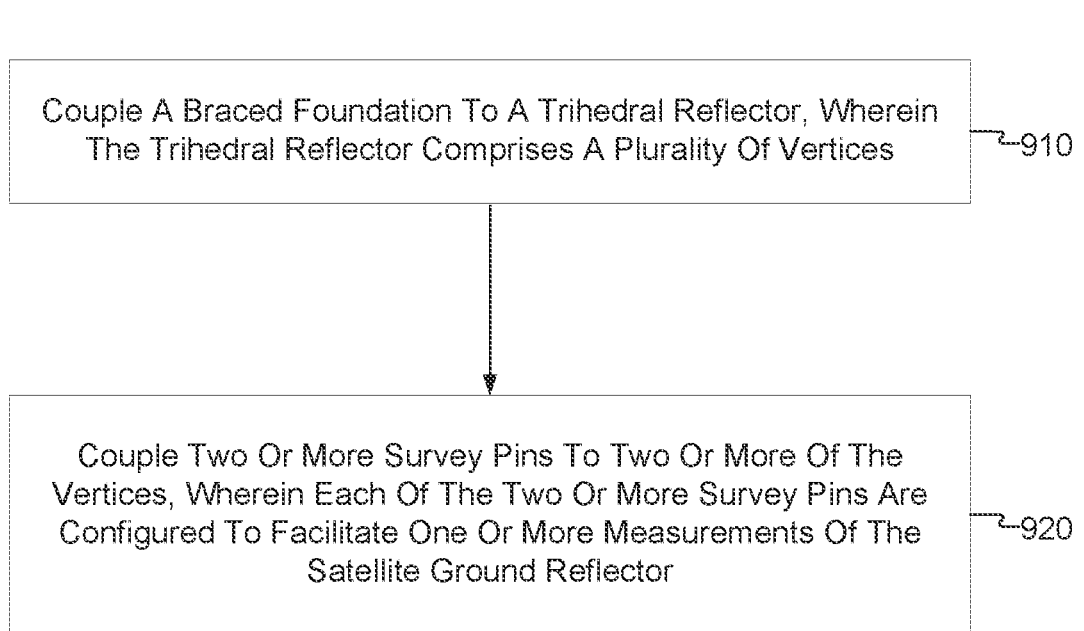
FIG. 9 illustrates an example process for constructing a satellite ground reflector, according to some aspects of the disclosed technology.

FIG. 9 illustrated an example process 900 for constructing a satellite ground reflector, according to some aspects of the disclosed technology. At step 910, process 900 includes coupling a braced foundation to a trihedral reflector, wherein the trihedral reflector comprises a plurality of vertices. For example, a trihedral reflector (e.g., trihedral reflector 102 as illustrated in FIG. 1) may include a plurality of vertices, such as three vertices. The trihedral reflector can be coupled or attached to a braced foundation (e.g., monument system 110 as illustrated in FIG. 1). The trihedral reflector may be attached to the braced foundation via support stantions or rigid structures (e.g., stantions 106 as illustrated in FIG. 1). The support stantions may be located on the underside of the bottom panel of the trihedral reflector.

At step 920, process 900 includes coupling two or more survey pins to two or more of the vertices, wherein each of the two or more survey pins are configured to facilitate one or more measurements of the satellite ground reflector. For example, two or more survey pins (e.g., Funderpin 600 as illustrated in FIG. 6) may be coupled or attached to two or more vertices of the trihedral reflector. The survey pins may facilitate measuring changes in position or orientation of the trihedral reflector (e.g., via RTK or EDM measurements, and or via the use of a plumb bob).

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A satellite ground reflector, comprising:
a braced foundation;
a trihedral reflector mounted to the braced foundation, wherein the trihedral reflector comprises a plurality of vertices; and
two or more survey pins attached to two or more of the plurality of vertices, wherein each of the two or more survey pins are configured to facilitate one or more measurements of the satellite ground reflector, and the two or more survey pins comprises cross hatch grooves.

2. The satellite ground reflector of claim 1, wherein the one or more measurements comprises a change in position of the trihedral reflector.

3. The satellite ground reflector of claim 1, wherein the one or more measurements comprises a change in orientation of the trihedral reflector.

4. The satellite ground reflector of claim 1, wherein the braced foundation is constructed from at least one of stainless steel, carbon steel, galvanized steel, aluminum, copper, bronze, brass, gold, titanium, cast iron or a combination thereof.

5. The satellite ground reflector of claim 1, further comprising:
one or more continuous Global Navigation Satellite System (cGNSS) antennas and receivers attached to one or more of the plurality of vertices.

6. The satellite ground reflector of claim 1, further comprising:
one or more plumb bobs attached to the two or more survey pins, wherein the one or more plumb bobs are configured to facilitate the one or more measurements of the satellite ground reflector.

7. The satellite ground reflector of claim 1, wherein the trihedral reflector is mounted to the braced foundation via one or more stantions.

8. The satellite ground reflector of claim 7, wherein the one or more stantions are constructed from at least one of stainless steel, carbon steel, galvanized steel, aluminum, copper, bronze, brass, gold, titanium, cast iron or a combination thereof.

9. The satellite ground reflector of claim 7, wherein the one or more stantions are coated with magnetic radar absorbent material (MagRAM).

10. A method for constructing a satellite ground reflector, comprising:
coupling a braced foundation to a trihedral reflector, wherein the trihedral reflector comprises a plurality of vertices; and
coupling two or more survey pins to two or more of the plurality of vertices, wherein each of the two or more survey pins are configured to facilitate one or more measurements of the satellite ground reflector, and the two or more survey pins comprises cross hatch grooves.

11. The method of constructing the satellite ground reflector of claim 10, wherein the one or more measurements comprises a change in position of the trihedral reflector.

12. The method of constructing the satellite ground reflector of claim 10, wherein the one or more measurements comprises a change in orientation of the trihedral reflector.

13. The method of constructing the satellite ground reflector of claim 10, wherein the braced foundation is constructed from at least one of stainless steel, carbon steel, galvanized steel, aluminum, copper, bronze, brass, gold, titanium, cast iron or a combination thereof.

14. The method of constructing the satellite ground reflector of claim 10, further comprising:
coupling one or more continuous Global Navigation Satellite System (cGNSS) antennas and receivers to one or more of the plurality of vertices.

15. The method of constructing the satellite ground reflector of claim 10, further comprising:
coupling one or more plumb bobs to the two or more survey pins, wherein the one or more plumb bobs are configured to facilitate the one or more measurements of the satellite ground reflector.

16. The method of constructing the satellite ground reflector of claim 10, wherein the trihedral reflector is coupled to the braced foundation via one or more stantions.

17. The method of constructing the satellite ground reflector of claim 16, wherein the one or more stantions are constructed from at least one of stainless steel, carbon steel, galvanized steel, aluminum, copper, bronze, brass, gold, titanium, cast iron or a combination thereof.

18. The method of constructing the satellite ground reflector of claim 16, wherein the one or more stantions are coated with magnetic radar absorbent material (MagRAM).

* * * * *